(12) United States Patent
Bruford et al.

(10) Patent No.: US 7,530,619 B1
(45) Date of Patent: May 12, 2009

(54) GRAB HANDLE WITH SPRING-LOADED STRIKER FOR PICK-UP TRUCKS

(75) Inventors: Stephen L. Bruford, West Bloomfield, MI (US); Laurence J. Holt, Uxbridge (CA); Charles Bambenek, Farmington, MI (US); Jeff Firzlaff, Royal Oak, MI (US); Robert A. Howell, Brooklin (CA)

(73) Assignees: Ford Global Technologies, LLC., Dearborn, MI (US); Multimatic, Inc., Markham (CA)

( * ) Notice: Subject to any disclaimer, the term of this patent is extended or adjusted under 35 U.S.C. 154(b) by 439 days.

(21) Appl. No.: 11/486,354

(22) Filed: Jul. 12, 2006

Related U.S. Application Data

(63) Continuation-in-part of application No. 11/236,133, filed on Sep. 27, 2005, now Pat. No. 7,090,276.

(51) Int. Cl.
*B62D 33/03* (2006.01)
(52) U.S. Cl. .................. 296/62; 296/1.02; 296/26.1
(58) Field of Classification Search .............. 296/51, 296/57.1, 62, 50, 1.02; 16/429
See application file for complete search history.

(56) References Cited

U.S. PATENT DOCUMENTS

| | | | | |
|---|---|---|---|---|
| 6,116,378 A * | 9/2000 | Barrow | ................. | 182/127 |
| 6,454,338 B1 * | 9/2002 | Glickman et al. | .......... | 296/57.1 |
| 6,739,639 B1 * | 5/2004 | Chumley et al. | ......... | 296/26.08 |
| 7,090,276 B1 * | 8/2006 | Bruford et al. | ................ | 296/62 |
| 7,201,419 B2 * | 4/2007 | Masterton | .................. | 296/26.1 |
| 7,347,473 B2 * | 3/2008 | Miller et al. | ................ | 296/26.1 |
| 2003/0188925 A1 * | 10/2003 | Korpi | ......................... | 182/127 |
| 2005/0093326 A1 * | 5/2005 | Miller et al. | ................ | 296/57.1 |
| 2005/0121933 A1 * | 6/2005 | Livingston | ................... | 296/62 |
| 2006/0261622 A1 * | 11/2006 | Kuznarik et al. | ............. | 296/62 |
| 2007/0096422 A1 * | 5/2007 | Dolan | ........................ | 280/163 |

\* cited by examiner

*Primary Examiner*—Jason S Morrow
(74) *Attorney, Agent, or Firm*—Greg Brown, Esq.; Miller Law Group, PLLC

(57) ABSTRACT

A pivotable grab handle device is movable between a stowed position, which is positioned against the main tailgate structure, and a deployed position that projects upwardly above the top surface of a lowered main tailgate structure. The grab handle device is mounted on a retainer bracket that is affixed to the top surface of the lowered main tailgate structure. The grab handle incorporates a spring-loaded latch mechanism that is cooperable with the pivot bracket when in the stowed position and cooperable with a striker plate mounted below the top surface of the main tailgate structure to fix the grab handle in the deployed position. A release lever projecting outwardly of the grab handle permits a retraction of the latch member to release the grab handle from either the pivot bracket or the striker plate to allow pivotal movement of the grab handle into the desired position.

19 Claims, 9 Drawing Sheets

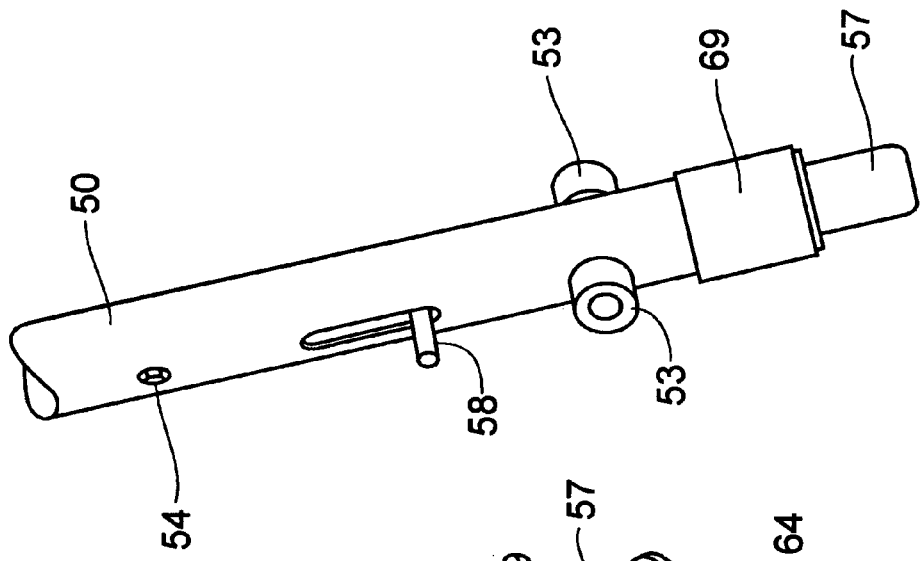
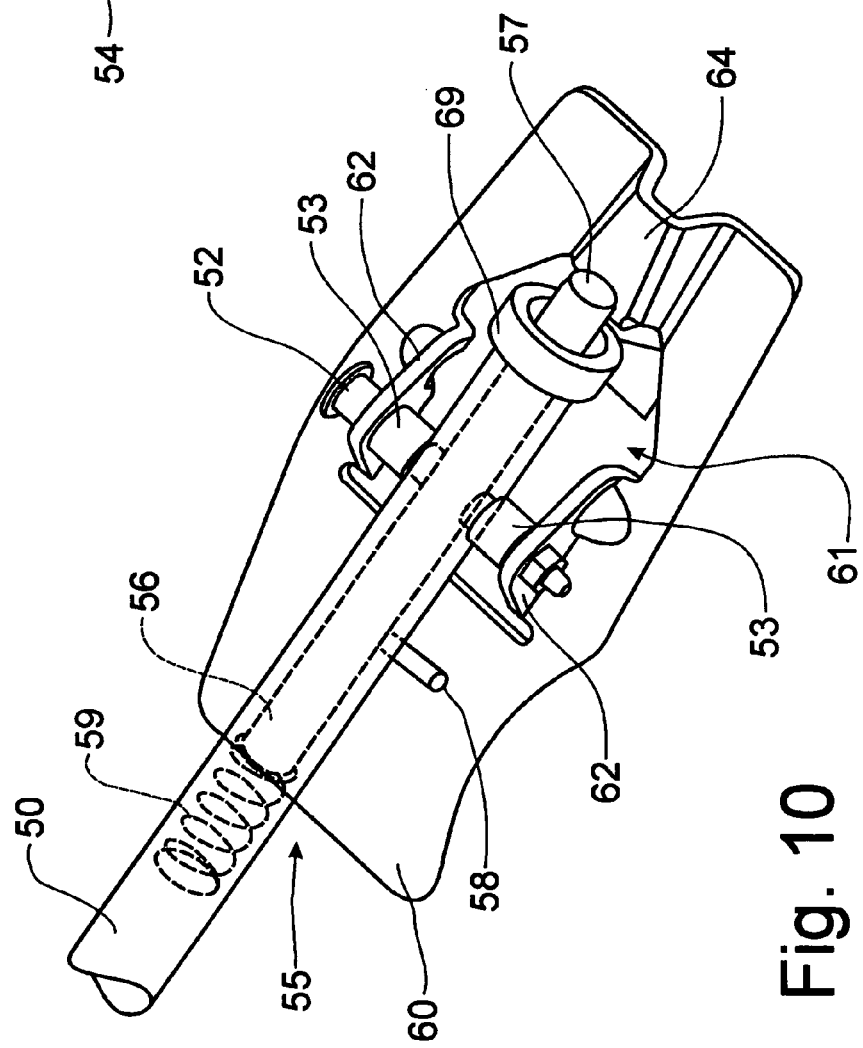

GRAB HANDLE WITH SPRING-LOADED STRIKER FOR PICK-UP TRUCKS

CROSS-REFERENCE TO RELATED APPLICATIONS

This application is a continuation-in-part of U.S. patent application Ser. No. 11/236,133, filed Sep. 27, 2005, granted as U.S. Pat. No. 7,090,276.

FIELD OF THE INVENTION

This invention relates to the utilization of a supplemental tailgate assembly housed with the tailgate of a pick-up truck and, more particularly, to a grab handle device to facilitate the use of the supplemental tailgate assembly as a step to gain access to the cargo area of the pick-up truck bed.

BACKGROUND OF THE INVENTION

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is sometimes desirable to have an extender that can provide other functions in addition to a bed extender, such as a box extender function—an upwardly extending structure from the rearmost edge of an open tailgate that mimics the function of a closed tailgate. Such arrangements are particularly useful for carrying a load that is longer than the bed, but needs rearward support, such as provided by a closed tailgate, in order to prevent the load from falling rearwardly off the pick-up truck. Again, though, typical box extenders that provide adequate functionality are externally mounted and not only detract from the vehicle appearance when not in use but also require changes to the box for mounting such extenders. Also, most of these types of extenders are very cumbersome to deploy and later stow away, thus being undesirable for the operator to use. Such functions may be provided with simple ergonomic operation of the assembly, while still allowing for an attractive appearance for the vehicle when the extender is stowed during periods of non-use. Thus, while the exterior mounted extenders may be able to perform multiple functions, they still suffer from the drawbacks of an unattractive appearance and taking up room in the bed even when not in use.

Positioning the extended supplemental tailgate structure generally perpendicularly to the plane of the main tailgate structure, while the main tailgate structure is moved to an open position such that the plane of the tailgate structure is substantially parallel to the bed of the pickup truck, places the extended supplemental tailgate structure in an orientation that is substantially parallel to the main tailgate structure when the main tailgate structure is in a normal closed position. In such an extended position, the supplemental tailgate can provide a restriction to the rearward movement of objects located on the bed of the pickup truck. Furthermore, such an extended position of the supplemental tailgate can provide support for objects placed on top of the supplemental tailgate.

Positioning the extended supplemental tailgate structure such that the supplemental tailgate structure hangs below the plane of the main tailgate structure permits the cross member of the supplemental tailgate to be utilized as a step. In fact, U.S. Pat. No. 6,918,624, granted on Jul. 19, 2005, from U.S. patent application Ser. No. 10/969,413, filed on Oct. 20, 2004, teaches that the cross member of the supplemental tailgate assembly can incorporate a flip-out step that enlarges the surface of the underside of the cross member of the supplemental tailgate structure to enhance the use thereof as a step. Such utilization of the supplemental tailgate assembly assists the operator in gaining physical access to the cargo area of the pick-up truck, which is particularly helpful whenever the bed of the pick-up truck to positioned substantially above the ground surface.

In some instances, it would be helpful for the person utilizing the step function of the supplemental tailgate assembly to have an extraneous structure to grasp for purposes of stability while climbing onto the step and then unto the top surface of the opened tailgate. Alternatively, it would also be helpful in some circumstances for the person utilizing the step function of the supplemental tailgate to have some extraneous structure for stability purposes while descending from the main tailgate structure via the supplemental tailgate assembly onto the ground.

Accordingly, it would be desirable to provide a stabilizing support structure positioned for utilization while the supplemental tailgate assembly is positioned as a step, while being positionable in a storage configuration that would not interfere with the conventional operation of the cargo bed, or the operation of the supplemental tailgate assembly in functions other than as a step.

SUMMARY OF THE INVENTION

It is an object of this invention to overcome the aforementioned disadvantages of the known prior art by providing a grab handle device stowable within the main tailgate structure to be deployed as needed when the supplemental tailgate assembly is being utilized as a step for accessing the cargo bed of the pick-up truck.

It is a feature of this invention that the grab handle device can be stored into the surface of the main tailgate structure to permit the full length of the cargo bed and lowered tailgate to be utilized.

It is another feature of this invention that the grab handle apparatus is pivotally mounted to permit convenient deployment thereof when needed.

It is an advantage of this invention that the grab handle device can be stowed within a mating cavity formed into the top surface of the lowered main tailgate structure.

It is another feature of this invention that the grab handle device can be extended a substantial height above the top surface of the lowered main tailgate structure.

It is another advantage of this invention that the substantial height of the grab handle device above the top surface of the lowered main tailgate structure allows the grab handle to be utilized effectively while standing on the main tailgate structure.

It is another object of this invention to provide an extraneous structure that can be used to stabilize a person using the supplemental tailgate assembly as a step to gain physical access into the cargo bed of a pick-up truck.

It is a further object of this invention to provide a grab handle device operable in conjunction with a supplemental tailgate assembly that is durable in construction, inexpensive of manufacture, carefree of maintenance, facile in assemblage, and simple and effective in use.

These and other objects, features and advantages are accomplished according to the instant invention by providing a pivotable grab handle device that is movable between a stowed position, which is positioned against the main tailgate structure, and a deployed position that projects upwardly above the top surface of a lowered main tailgate structure. The grab handle device is mounted on a pivot bracket that is affixed to the top surface of the lowered main tailgate structure. The grab handle incorporates a spring-loaded latch mechanism that is cooperable with the pivot bracket when in the stowed position and cooperable with a striker plate mounted below the top surface of the main tailgate structure to fix the grab handle in the deployed position. A release lever projecting outwardly of the grab handle permits a retraction of the latch member to release the grab handle from either the pivot bracket or the striker plate to allow pivotal movement of the grab handle into the desired position.

BRIEF DESCRIPTION OF THE DRAWINGS

The advantages of this invention will become apparent upon consideration of the following detailed disclosure of the invention, especially when taken in conjunction with the accompanying drawings wherein:

FIG. 10 is an enlarged perspective detail view of the retainer bracket for the alternative embodiment of the grab handle depicted in the stowed position with the latch member engaged with the retainer bracket to fix the grab handle in the stowed position, the internal spring-loaded latch mechanism being shown in dashed lines; and FIG. 11 is an enlarged partial perspective view of the lower end of the grab handle formed according to the alternative embodiment depicted in FIGS. 8-10.

DETAILED DESCRIPTION OF THE PREFERRED EMBODIMENT

Figure 1:
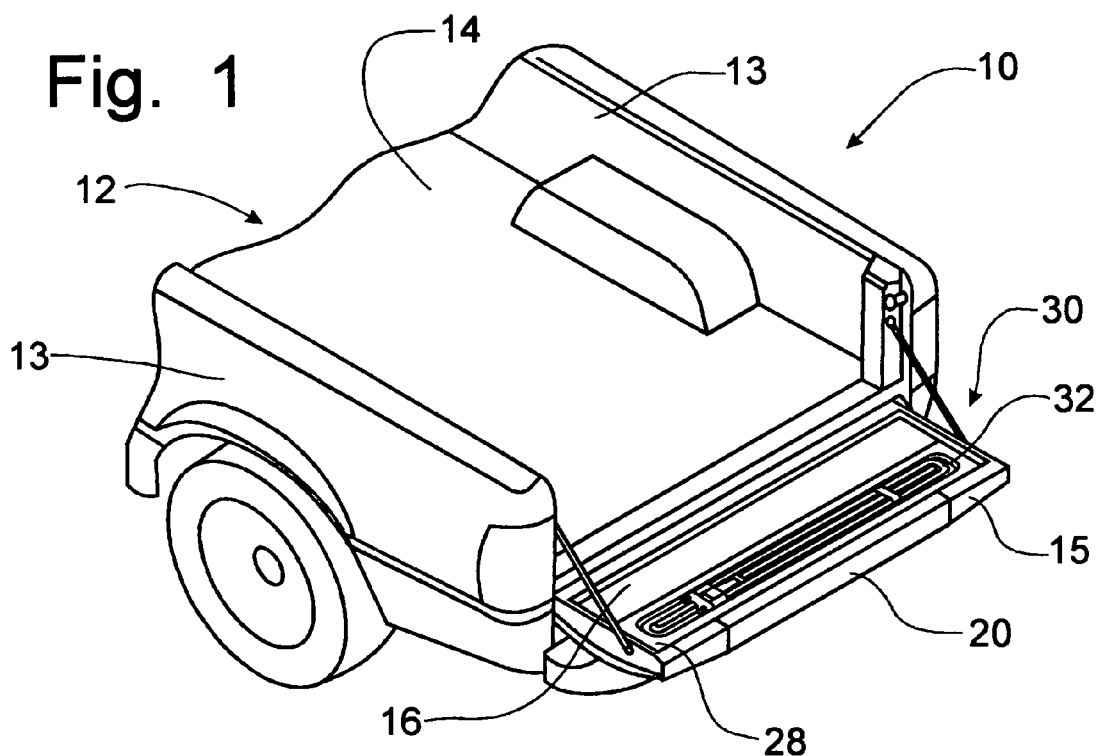
FIG. 1 is a partial perspective view of a cargo bed of a pick-up truck incorporating the principles of the instant invention, the pivotable grab handle being depicted in the stowed position, the main tailgate structure is lowered into the open position with the supplemental tailgate being stored internally thereon.
Figure 2:
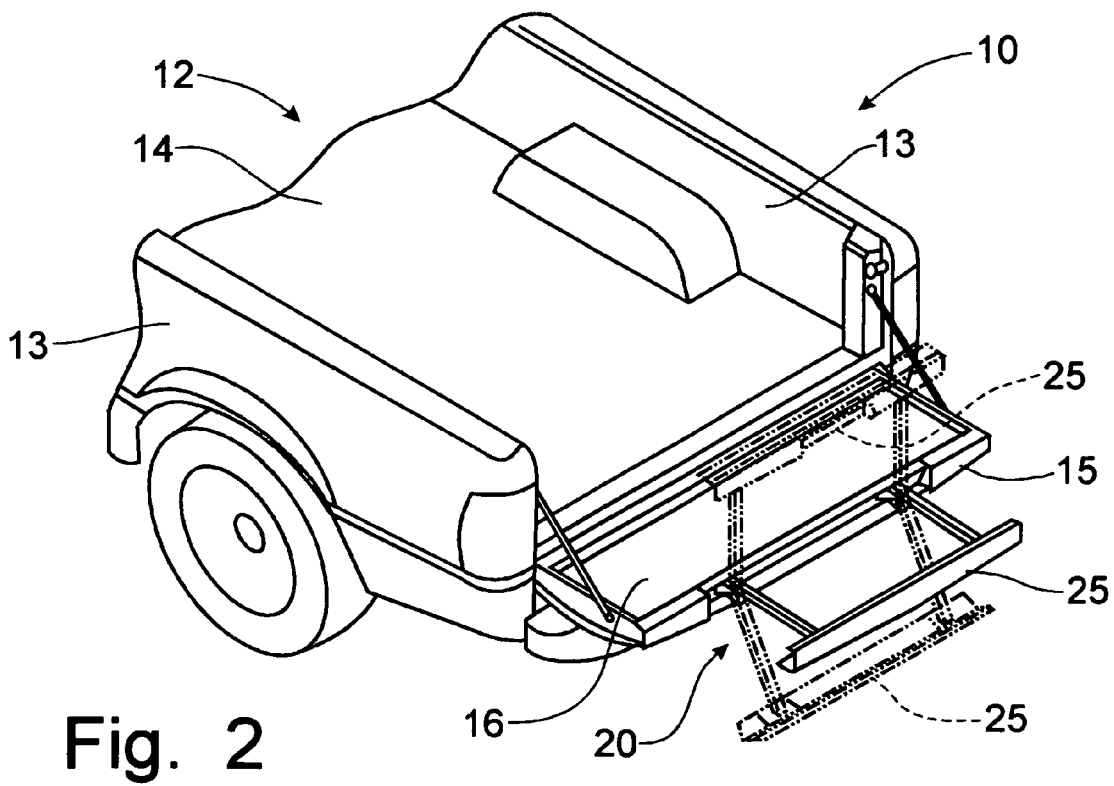
FIG. 2 is a perspective view of a pick-up truck cargo bed similar to that of FIG. 1, but with the supplemental tailgate assembly being extended from the stored position internally of the main tailgate structure, the pivotal movement of the supplemental tailgate structure upwardly and downwardly being depicted in phantom, the grab handle being deleted for purposes of clarity.
Figure 3:
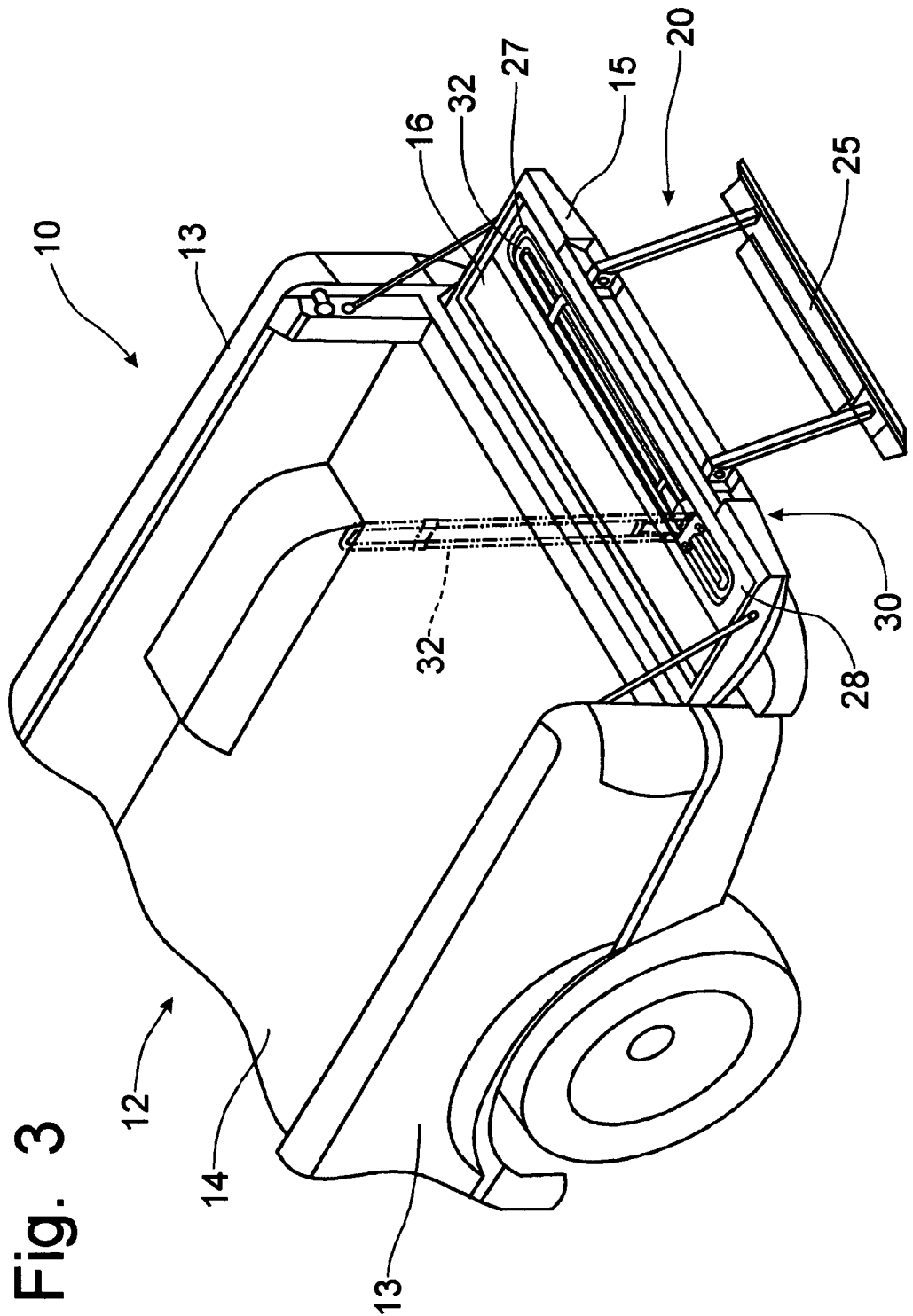
FIG. 3 is an enlarged perspective view of a pick-up truck cargo bed similar to that of FIGS. 1 and 2, but with the supplemental tailgate assembly being lowered into the step function, the grab handle being shown in the deployed position in phantom.

Referring to FIGS. 1-3, a pick-up truck cargo bed is provided with a main tailgate structure incorporating the principles of the instant invention. Any left and right references are used as a matter of convenience and are determined by standing at the rear of the cargo bed where the tailgate is pivotally mounted and facing the cargo bed, the normal direction of travel of the pick-up truck.

The pick-up truck 10 is conventionally manufactured with a cargo bed 12 forming the rearward portion of the vehicle 10. The cargo bed 12 includes generally vertical, upright side walls 13 having a floor member 14 extending generally horizontally therebetween. The tailgate 15 extends transversely above the floor 14 between the side walls 13 at the rearwardmost portion of the cargo bed 12. The tailgate 15 is pivotally mounted to the floor 14 and is movable between an upright closed position that is oriented perpendicularly to the floor 14 and a lowered open position that forms an extension of the floor 14 rearwardly of the side walls 13, as is shown in the drawings.

A supplemental tailgate assembly 20 of the type shown and described in U.S. patent application Ser. No. 10/969,413, now issued as U.S. Pat. No. 6,918,624, on Jul. 19, 2005, the contents of which are incorporated herein by reference. Such a supplemental tailgate assembly 20 can be stored within the interior of the tailgate 15 until deployed with the tailgate 15 lowered into the open position and the supplemental tailgate assembly 20 oriented generally vertically to serve as a substitute tailgate while the top surface of the lowered tailgate 15 serves as an extension of the cargo bed 12. As is depicted in phantom in FIG. 2, the supplemental tailgate assembly 20 is also pivotally movable into a lowered position such that the cross member 22 is lower than the main tailgate structure. As is disclosed in the aforementioned U.S. patent Ser. No. 10/969,413, the cross member 25 can also incorporate a flip-out step member (not shown) that enhances the use of the cross member 25 as a step.

With the supplemental tailgate 20 positioned below the main tailgate structure 15 to perform the step function of the supplemental tailgate 20, a user of the assembly 20 can step upon the cross member 25, and any extended step member (not shown) if provided, and be assisted in making the next step on onto the top surface 16 of the lowered tailgate 15, thereby providing physical access to the cargo bed 12 and anything stored thereon.

Climbing onto the cargo bed 12, can be facilitated by the use of a grab handle assembly 30 by which the person climbing onto the cross member 25 of the lowered supplemental tailgate assembly 20 can be stabilized while ascending the supplemental tailgate 20 and the top surface 16 of the lowered tailgate 15. Preferably, the grab handle assembly 30 will be capable of being deployed to assist a person descending from the main tailgate 15 to the surface of the ground through the use of the supplemental tailgate assembly 20.

Figure 4:
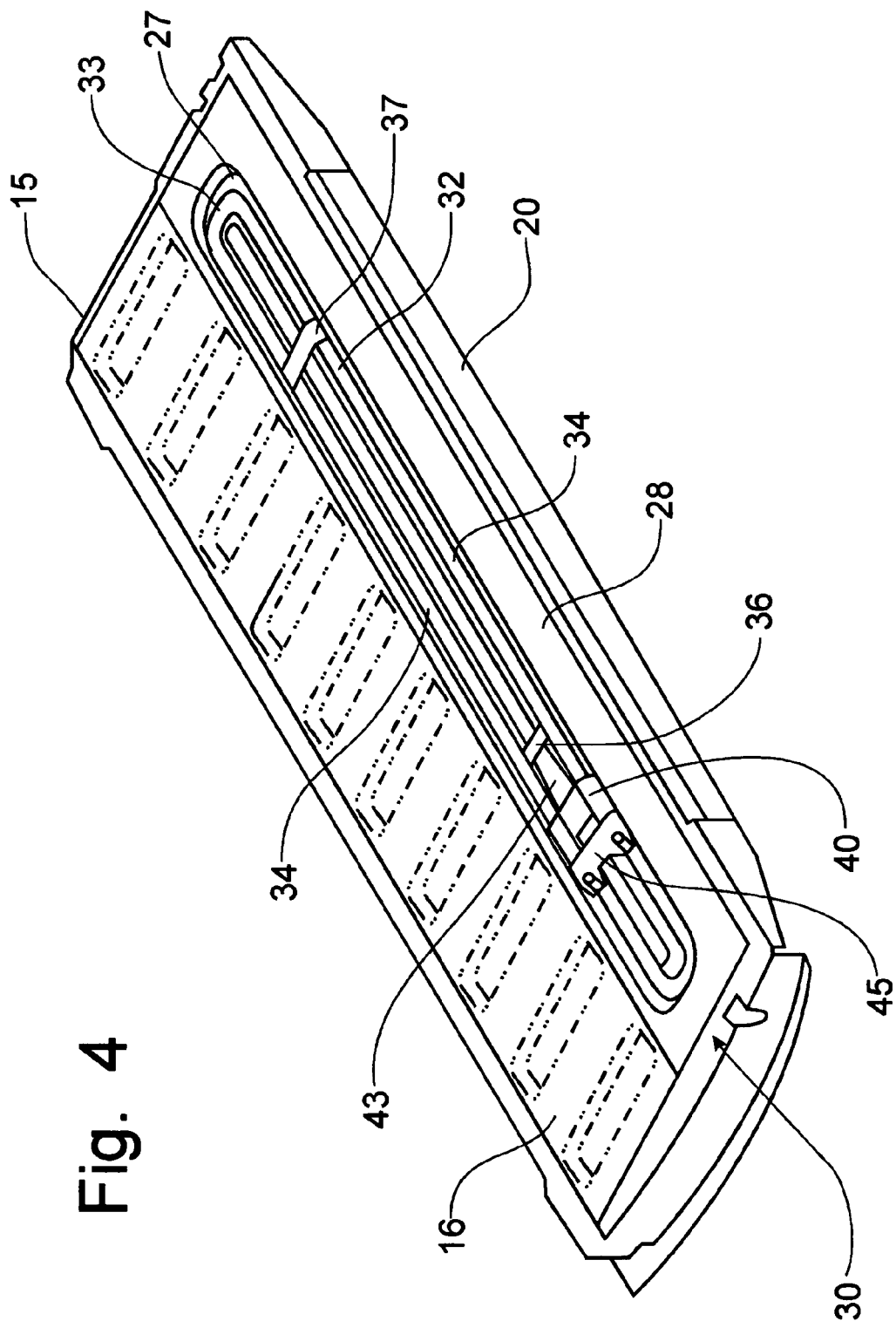
FIG. 4 is an enlarged perspective view of the main tailgate structure similar to that shown in FIG. 1 with the grab handle being placed in the stowed position and the supplemental tailgate being stored internally of the main tailgate structure.

The grab handle assembly 30 includes an elongated handle member 32 that is oriented transversely across the top surface 16 of the tailgate 15. The handle member 32 is positionable in a lowered stowed position, best seen in FIG. 4, received within a cradle 27 formed as part of a cover panel 28 into a mating shape with respect to the handle member 32. When the handle member 32 is placed in the stowed position in the cradle 27, the handle member 32 is recessed into the top surface 16 of the main tailgate structure 15 so as to not interfere with the normal operation of the cargo bed 12.

Figure 6:
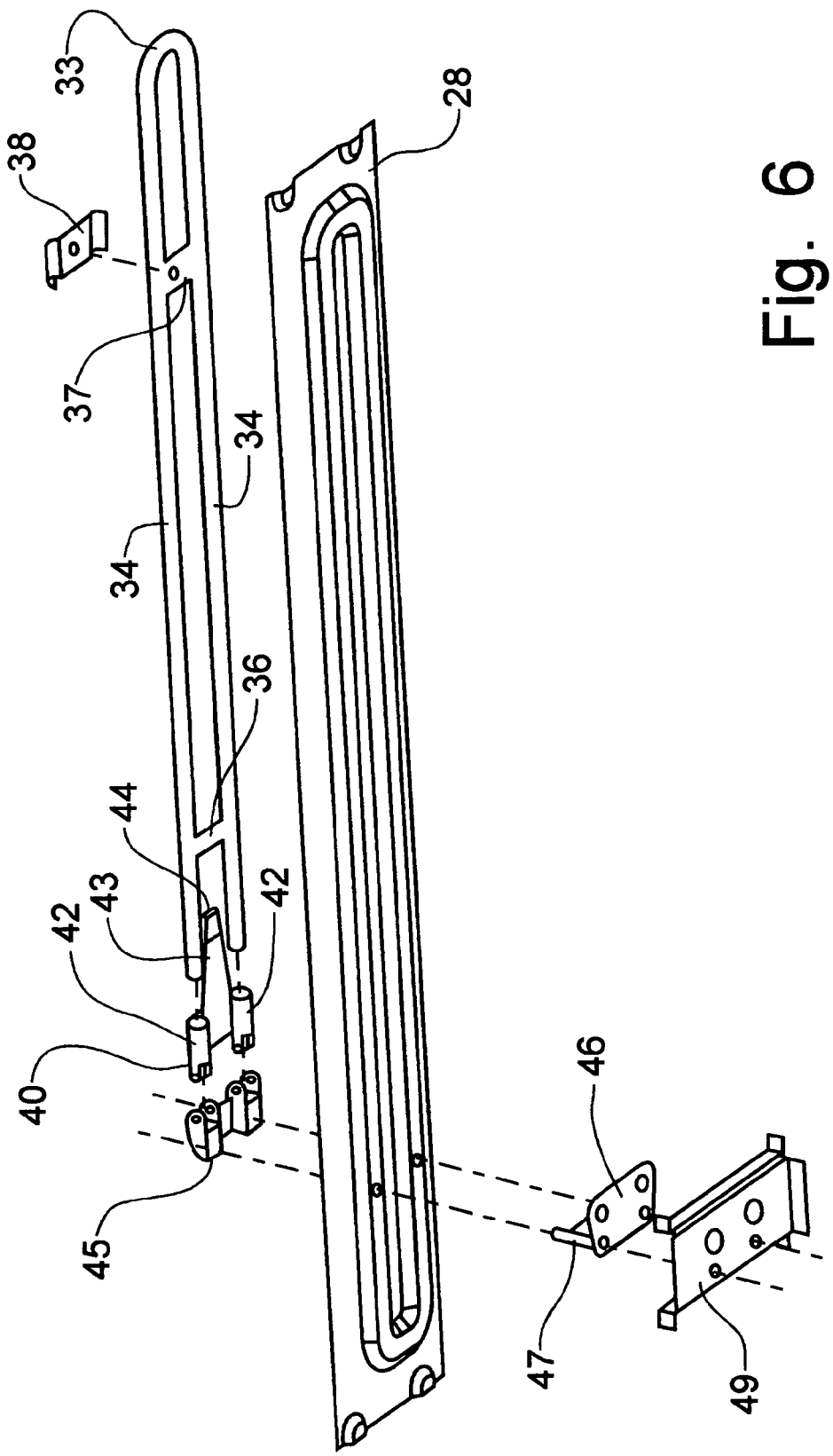
FIG. 6 is an enlarged exploded perspective view of the grab handle assembly looking from below the assembly.
Figure 7:
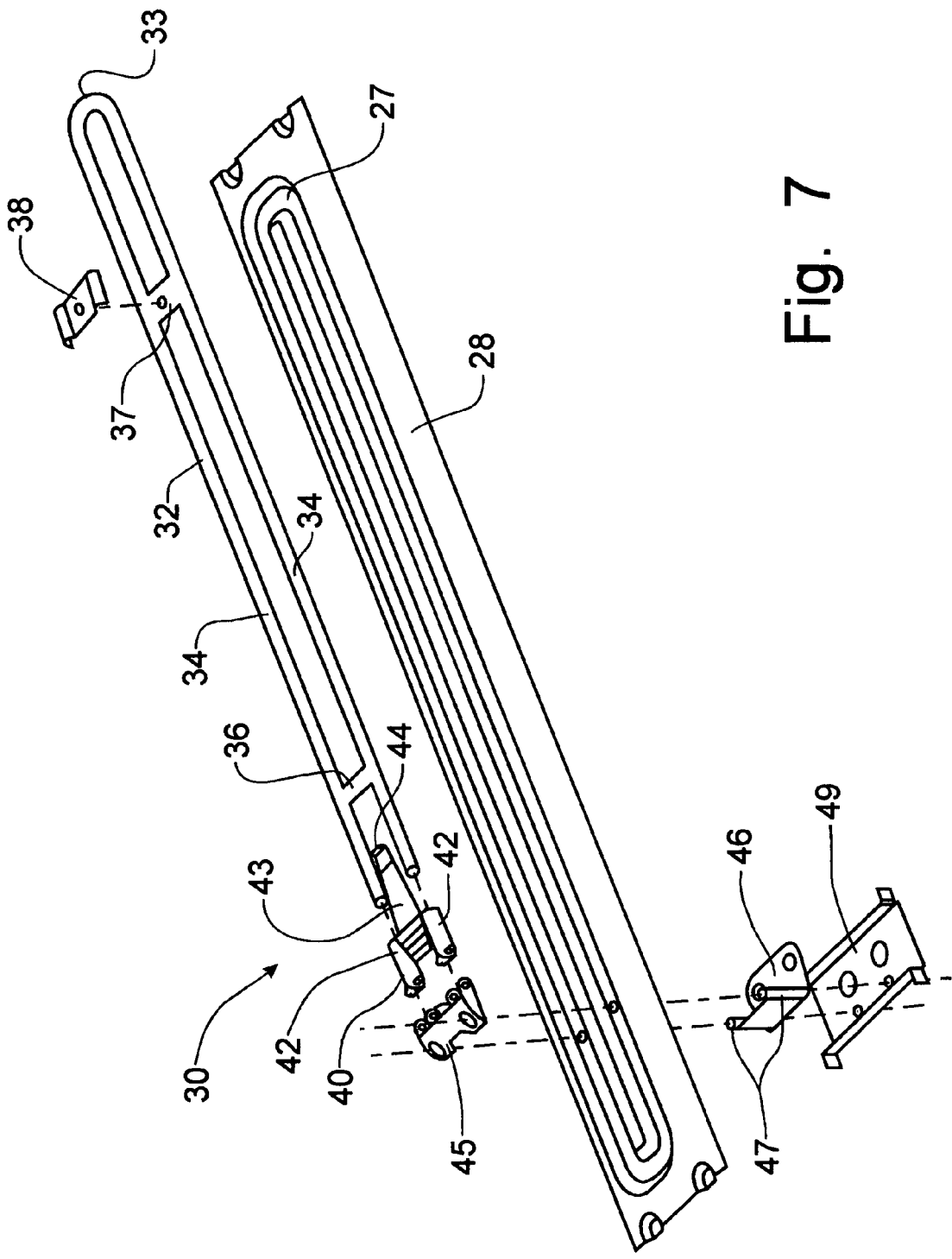
FIG. 7 is an enlarged exploded perspective view of the grab handle assembly looking from above the assembly.

The handle member 32 is preferably formed with a bight portion 33 from which a pair of elongated legs 34 extends. The legs 34 are received within a retainer bracket 40 that is formed with a pair of sleeves 42 into which the legs 34 fit. The retainer bracket 40 is also formed with a support tongue 43 that extends from between the sleeves 42 into engagement with a first transverse brace 36 that interconnects the two legs 34 to provide strength and stability to the grab handle member 32. The tongue 43, as is best seen in FIG. 7, is formed with a lip 44 that wraps around the edge of the brace 36 to provide enhanced engagement therebetween. A distal second transverse brace 37 positioned near the bight portion 33 adds further strength and stability to the grab handle member 32. A grip member 38, best seen in FIGS. 6 and 7, can be mounted on the second transverse brace 37 to facilitate grasping of the brace 37 and handle member 32 by a person using the step function of the supplemental tailgate assembly 20.

Figure 5:
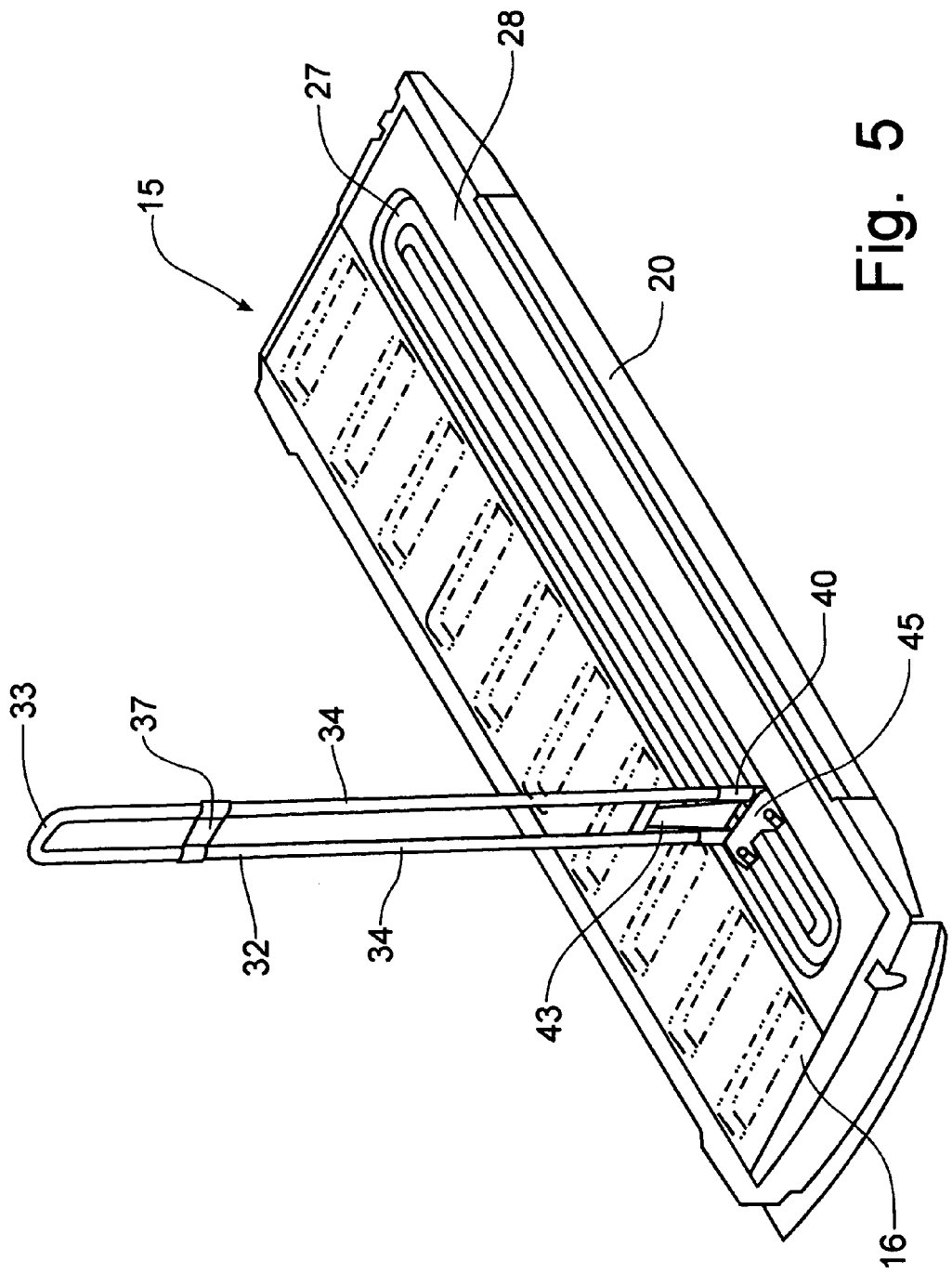
FIG. 5 is an enlarged partial perspective view of the main tailgate structure similar to that of FIG. 4, but with the grab handle shown in the deployed position.

The retainer bracket 40 is pivotally connected to a pivot bracket 45 that is clamped to the cover panel 28 by a clamping bracket 46 positioned below the cover panel 28. Preferably, the clamping bracket 46 is formed with upright supports 47, best seen in FIG. 7, that extend through appropriate openings in the cover panel 28 for engagement with the pivot bracket 45 and secured thereto by suitable fasteners (not shown). The pivot bracket 45 pivotally supports the retainer bracket 40 to permit movement thereof between the horizontal stowed position depicted in FIG. 4 and the vertical deployed position depicted in FIG. 5. Preferably the retainer bracket 40 is formed of molded plastic and can be snap fit into engagement with the pivot bracket 45. The clamping bracket 46 is preferably mounted to an anchoring bracket 49 that is affixed to the main tailgate structure 15 internally thereof in a position that would not interfere with the deployment of the supplemental tailgate assembly 20. The pivot bracket 45 is formed to provide interference with the retainer bracket 40 when the retainer bracket 40 reaches the vertical deployed position so that the retainer bracket 40 cannot pivot more than the requisite approximately 90 degrees to move the retainer bracket 40 from the horizontal stowed position to the vertical deployed position.

In operation, an operator would extend the supplemental tailgate assembly 20, as is depicted in FIG. 2, from the lowered main tailgate structure 15 and pivot the supplemental tailgate assembly 20 downwardly to the position depicted in FIG. 3 to provide the step function of the cross member 25, as is described in detail in the aforementioned U.S. patent Ser. No. 10/969,413. The grab handle member 32 would then be freed from a latching device (not shown), which serves to retain the grab handle assembly 30 in the stowed position whether the main tailgate structure 15 is raised in the closed position or lowered into the open position, and pivoted into the deployed position depicted in FIG. 5. The operator can then grasp the handle member 32, such as at the second transverse brace 37 or the bight portion 33, and use the grab handle to stabilize his body as he steps onto the cross member 25, which may have deployed a flip-out step member 26, best seen in FIG. 3. The grab handle 32 extends a sufficient height above the top surface 16 of the main tailgate 15 so that the handle 32 can provide continued stabilizing support as the operator continues his ascension onto the top surface 16 of the main tailgate 15.

Since the grab handle 32 extends substantially far above the top surface 16 of the main tailgate 15, the grab handle assembly 30 can provide stabilization for an operator descending from the main tailgate 15 onto the lowered cross member 25 of the supplemental tailgate assembly 20, and for the operator to continue his descending from the cross member 25 onto the ground. The grab handle 32 is easily deployed and returned to the stowed position and is positioned for convenient use by an operator utilizing the step function of the lowered supplemental tailgate assembly 20.

The cover panel 28 is connected to the main tailgate structure 15 by removable fasteners (not shown) to permit the disconnection of the pivot bracket 45 from the clamping bracket 46 and then completely remove the grab handle assembly 30. Furthermore, the cover panel 28 provides an access opening when removed from the main tailgate structure 15 to reach the supplemental tailgate assembly 20 while retracted internally of the main tailgate structure 15.

Referring now to FIGS. 8-11, an alternative embodiment of the grab handle device can best be seen. The grab handle 50 is a linear tubular member having a length substantially identical to the grab handle device 30 described above. A pivot bracket 60 is affixed to the top surface 16 of the main tailgate structure 15, preferably by detachable fasteners (not shown), to facilitate the removal thereof for service and repair, as needed. The pivot bracket 60 is formed with a pair of spaced apart, upright mounting lugs 62 that supports a detachable fastener serving as a pivot pin 52 that passes through each of the upright mounting lugs 62, through spacers 53 oriented between the mounting lugs 62 and the grab handle 50, and through an appropriate opening through the grab handle 50. The pivot bracket 60 is also formed with a retainer ridge 64 that is formed in an elevated orientation above the top surface 16 of the tailgate 15, as will be described in greater detail below.

The grab handle 50 incorporates an internal spring-loaded latch mechanism 55 that includes a tip 57 extending outwardly of the lower terminus of the grab handle 50. The latch mechanism 55 includes a striker member 56 mounted internally of the grab handle 50 at the lower terminus such that the tip 57 projects outwardly therefrom. A spring 59 supported and retained within the grab handle 50 by appropriate detents 54 formed into the tubular grab handle 50. A release lever 58 is affixed to the striker member 56 to permit a manual manipulation thereof to retract the tip 57 into the tubular grab handle 50 against the biasing force exerted by the spring 59 to extend the tip 57 of the striker member 56 out of the grab handle 50.

Figure 8:
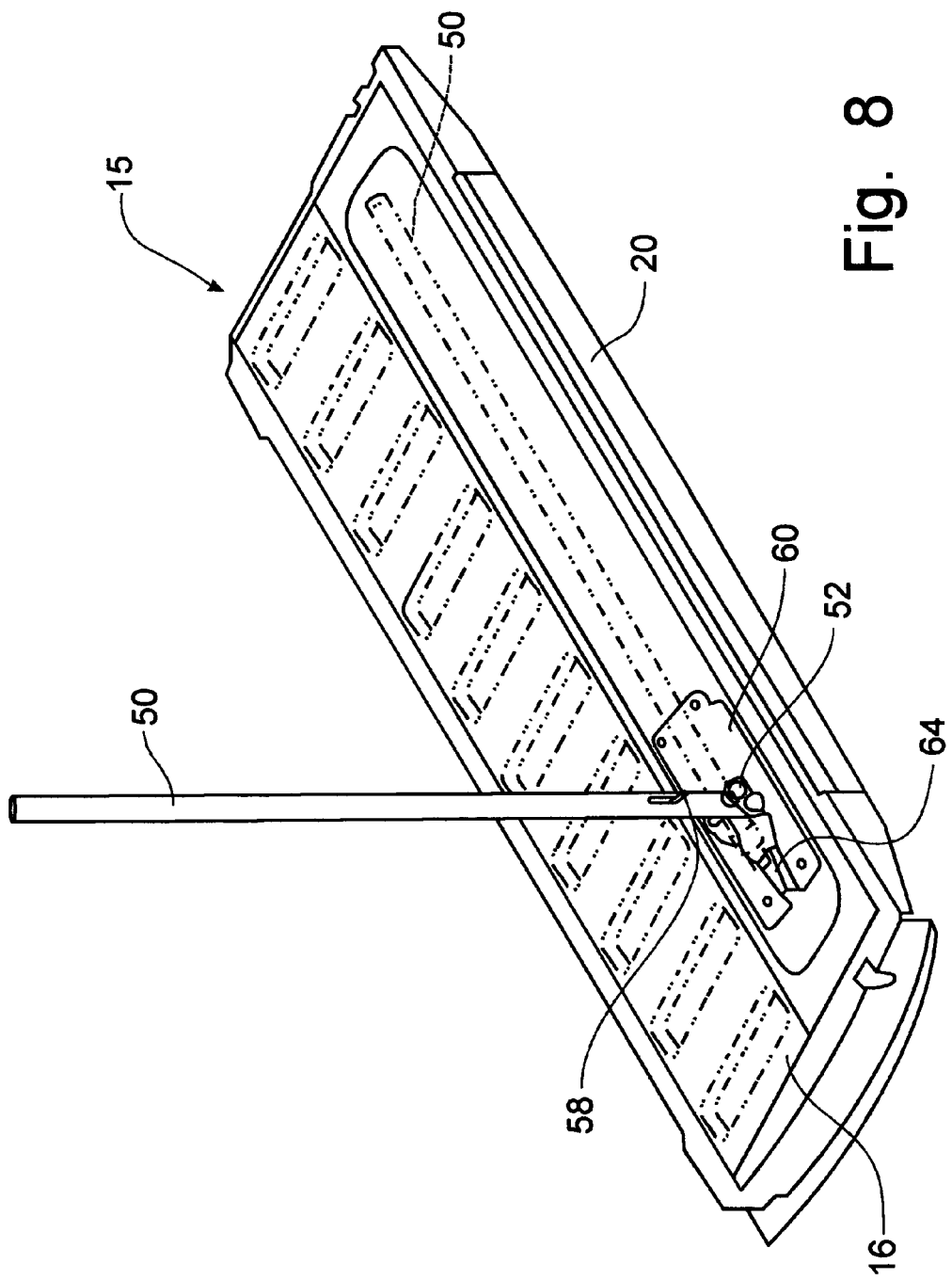
FIG. 8 is an enlarged partial perspective view of the main tailgate structure similar to that of FIG. 5, but depicting an alternative embodiment of the grab handle shown in the deployed position, the stowed position being shown in phantom.
Figure 9:
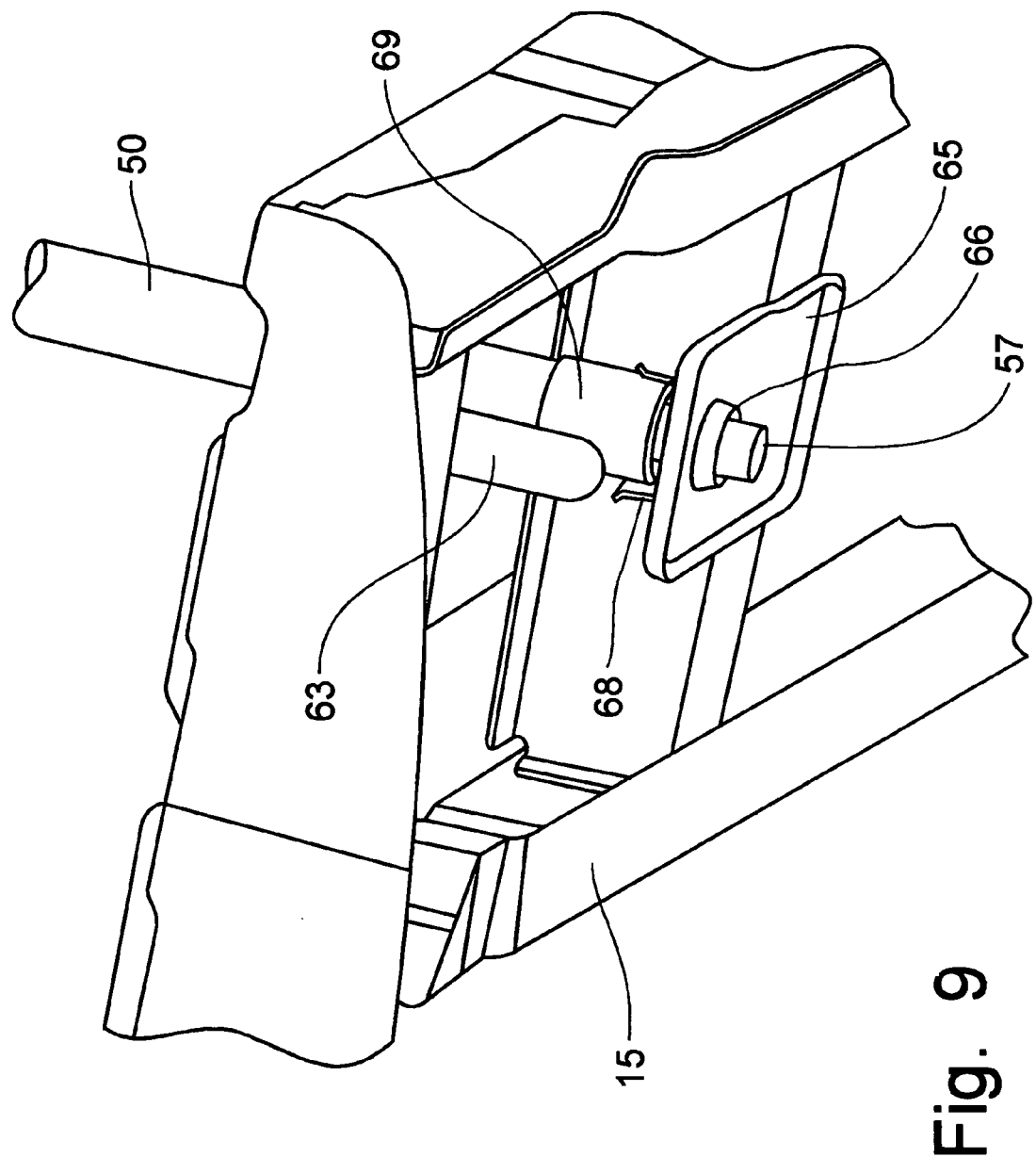
FIG. 9 is an enlarged partial perspective view of the main tailgate structure with portions thereof being broken away to better view the internal striker plate engagable with the grab handle embodiment depicted in FIG. 8 to restrain the grab handle in the deployed position.

When the grab handle 50 is in the stowed position, shown in phantom in FIG. 8 and in solid lines in FIG. 10, the tip 57 is positioned on top of the retainer ridge 64 which is positioned at the appropriate height when engaged with the tip 57 of the spring-loaded striker member 56 to latch the grab handle 50 in the stowed position. The grab handle 50 cannot be elevated out of the stowed position until the tip 57 of the striker member 56 is retracted into the grab handle 50 allowing the grab handle 50 to rotate about the pivot pin 52. As is best seen in FIG. 9, the tailgate 15 mounts a striker plate 65 internally of the main tailgate structure 15 to receive the lower terminus of the grab handle 50 when rotated into the deployed position.

The striker plate 65 is formed with a vertically oriented opening 66 for receipt of the tip 57 of the striker member 56 and a positioning bracket 68. Preferably, the grab handle 50 includes an elastomeric isolator cushion 69 mounted at the lower terminus thereof to engage the positioning bracket 68 and isolate the grab handle 50 from vibrations. The striker plate 65 is oriented to engage the tip 57 to cause a retraction thereof against the spring 59 until the tip 57 becomes aligned with the opening 66, whereupon the tip 57 snaps into the opening 66 to secure the grab handle 50 in the upright deployed position. The release of the grab handle 50 from the striker plate 65 is effected by a manual manipulation of the release lever 58 to retract the striker member 56 and allow the tip 57 to disengage the striker plate 65.

As the lower end of the grab handle 50 is rotating upwardly away from the striker plate 65, while the grab handle 50 is moving back toward the stowed position, the tip 57 of the striker member 56 engages the retractor plate 63 to cause the tip 57 to retract into the tubular grab handle 50 until the lower end carrying the tip 57 passes above the retainer ridge 64, whereupon the biasing force exerted by the spring 59 forces the tip 57 over top of the retainer ridge to lock the grab handle in the stowed position. The purpose of the retractor plate 63 is to retract the striker member so that the tip will be above the retainer ridge 64 to lock the grab handle 50 in place.

One of ordinary skill in the art will recognize that the top surface 16 of the tailgate structure 15 could be formed in a manner that recesses the pivot bracket 60, mounting lugs 62 and grab handle 50 when oriented into the stowed position, into the top surface 16, although an opening 61 between the retainer ridge 64 and the mounting lugs 62 would be necessary to allow the passage of the lower end of the grab handle 50 when pivoting between the stowed and deployed positions. In the alternative, the pivot bracket 60 and the grab handle 50 when in the stowed position could rest on top of the top surface 16.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a pick-up truck having a cargo bed defined by opposing lateral upright side walls and a floor extending transversely between the side walls, and a main tailgate structure pivotally supported between said side walls for movement between an upright closed position and a lowered open position, said main tailgate structure having a top surface that is generally planar with said cargo bed when said tailgate is in said lowered open position, the improvement comprising:
   a supplemental tailgate assembly housed within said main tailgate structure and being extendable from said main tailgate structure and positionable for use as a step to facilitate access onto said main tailgate structure when in said lowered open position;
   a grab handle mounted on said main tailgate in proximity to said supplemental tailgate assembly and being movable between a stowed position and a deployed position; and
   a latch mechanism cooperable with said grab handle to selectively lock said grab handle in said deployed position.

2. The pick-up truck of claim 1 wherein said latch mechanism includes a spring-loaded striker member that is engagable with a striker plate mounted on said main tailgate structure to secure said grab handle in said deployed position.

3. The pick-up truck of claim 2 wherein said grab handle comprises an elongated tubular handle member pivotally mounted on said top surface of said main tailgate structure for movement between said stowed and deployed positions.

4. The pick-up truck of claim 3 wherein said handle member is pivotally connected to a pivot bracket attached to said top surface of said main tailgate structure.

5. The pick-up truck of claim 4 wherein said striker member and a spring are supported internally of said handle member such that a tip of said striker member is extendable from an end of said handle member to engage said striker plate.

6. The pick-up truck of claim 5 wherein said latch mechanism is also operable to lock said grab handle in said stowed position, said pivot bracket including an elevated retainer ridge engagable with said striker member to lock said grab handle in said stowed position.

7. The pick-up truck of claim 6 wherein said striker member has a release lever extending outwardly of said handle member for manual manipulation to retract said striker member into said handle member to effect a selective disengagement of said striker plate.

8. The pick-up truck of claim 6 wherein said pivot bracket includes a retractor plate positioned to engage said tip of said striker member to retract said tip into said grab handle until said tip is released above said retainer ridge.

9. A tailgate pivotally mounted to a cargo bed of a pick-up truck to be movable between a raised closed position and a lowered open position, said tailgate having a top surface that is generally planar with said cargo bed when said tailgate is in said lowered open position, comprising:
   a housing hinged to said cargo bed and including said top surface and an opposing outer surface and defining a cavity between said top surface and said outer surface;
   a supplemental tailgate assembly mounted within said cavity defined by said tailgate housing and being movable between a stored position within said housing and one or more operative positions extended outwardly from said housing, said supplemental tailgate assembly including a cross member positionable below said lowered tailgate in one of said operative positions to provide a step function to facilitate access onto said top surface of said lowered tailgate;
   a tubular grab handle pivotally mounted on said top surface for movement between a stowed position and a deployed position proximate to said supplemental tailgate assembly such that a person utilizing said step function of said supplemental tailgate can grasp said grab handle when stepping onto said cross member; and
   a latch mechanism associated with said grab handle to lock said grab handle in said deployed position.

10. The tailgate of claim 9 wherein said latch mechanism includes a striker member slidably mounted within said tubular grab handle and biased to extend a tip of said striker member outwardly of said grab handle.

11. The tailgate of claim 10 wherein said latch mechanism further includes a spring supported within said tubular grab handle and being operably connected to said striker member to bias said striker member to extend said tip outwardly of said grab handle.

12. The tailgate of claim 10 wherein said latch mechanism further includes a release lever connected to said striker member and projecting outwardly of said grab handle for manual manipulation thereof to selectively retract said tip of said striker member into said grab handle.

13. The tailgate of claim 12 wherein said housing supports a striker plate positioned to be engagable with said striker member when said grab handle moves into said deployed position.

14. The tailgate of claim 13 further comprising a pivot bracket affixed to said housing for pivotally mounting said grab handle, said pivot bracket being formed with an elevated retainer ridge and a retractor plate positioned for engagement with said tip of said striker member when moving from said deployed position into said stowed position, said retractor plate causing said tip to retract into said grab handle until being positioned above said retainer ridge, whereupon said grab handle is in said stowed position, said retainer ridge being in an interfering position with respect to said tip to secure said grab handle in said stowed position.

15. A grab handle assembly mounted on a main tailgate of a pick-up movable between a lowered open position and a raised closed position, said main tailgate structure having a top surface that is generally planar with said cargo bed when said tailgate is in said lowered open position, comprising:
   an elongated tubular handle member mounted in a stowed position on a top surface of said main tailgate when in said lowered open position and being pivotally movable on said top surface of said main tailgate from said stowed position into an upright deployed position extending upwardly from said top surface when said main tailgate is in said lowered open position; and
   a latch mechanism associated with said grab handle to lock said grab handle in said deployed position.

16. The grab handle assembly of claim 15 wherein said latch mechanism comprises:
   a striker member slidably supported in said handle member and being movable into a latching position with a tip thereof extended outwardly of an end of said handle member;
   a spring supported within said handle member in operative engagement with said striker member to bias said striker member toward said latching position; and
   a striker plate supported within said main tailgate for engagement with said tip of said striker member when said grab handle moves into said deployed position.

17. The grab handle assembly of claim 16 wherein said latch mechanism further comprises a release lever connected to said striker member and projecting outwardly of said handle member for manual manipulation to overcome the biasing force of said spring to allow a retraction of said tip into said handle member.

18. The grab handle assembly of claim 16 wherein said grab handle assembly further comprises a pivot bracket pivotally mounting said handle member on said top surface of said main tailgate, said pivot bracket including an elevated retainer ridge positioned such that, when said handle member is in said stowed position, said tip of said striker member is positioned above said retainer ridge in an interfering relationship therewith to secure said handle member in said stowed position until said striker member is retracted into said handle member.

19. The grab handle assembly of claim 18 wherein said pivot bracket also includes a retractor plate extending downwardly from said retainer ridge so that said tip of said striker plate engages said retractor plate to force said tip into said handle member against the biasing force exerted by said spring until said tip clears above said retainer ridge.

\* \* \* \* \*